(12) United States Patent
Shelton et al.

(10) Patent No.: US 11,198,986 B2
(45) Date of Patent: Dec. 14, 2021

(54) METHOD OF MAKING AN INTEGRAL GEOGRID FROM A COEXTRUDED MULTILAYERED POLYMER STARTING MATERIAL

(71) Applicant: TENSAR CORPORATION, LLC, Alpharetta, GA (US)

(72) Inventors: William Stanley Shelton, Lithonia, GA (US); Manoj Kumar Tyagi, Fayetteville, GA (US)

(73) Assignee: TENSAR CORPORATION, Alpharetta, GA (US)

( * ) Notice: Subject to any disclaimer, the term of this patent is extended or adjusted under 35 U.S.C. 154(b) by 0 days.

(21) Appl. No.: 16/855,184

(22) Filed: Apr. 22, 2020

(65) Prior Publication Data

US 2020/0283983 A1    Sep. 10, 2020

Related U.S. Application Data

(62) Division of application No. 15/766,960, filed as application No. PCT/US2016/055768 on Oct. 6, 2016.

(51) Int. Cl.
  *E02D 17/20*    (2006.01)
  *B29C 48/30*    (2019.01)
  (Continued)

(52) U.S. Cl.
  CPC ............ *E02D 17/202* (2013.01); *B29C 48/08* (2019.02); *B29C 48/16* (2019.02); *B29C 48/18* (2019.02);
  (Continued)

(58) Field of Classification Search
  CPC ...... B29C 2793/0018; B29C 2793/003; B29C 2793/0045; B29C 2793/0081; B29C 2793/009; B29C 55/12; B29C 55/02; B29C 55/04; B29C 48/495; B29C 48/305; B29C 48/18; B29C 48/16; B29C 48/49; B29C 48/307; B29C 48/304; B29C 48/30; B29C 48/0018; B29C 48/185; E02D 17/202; E02D 2300/0084; E02D 29/02; E02D 3/005; E02D 17/20; B32B 2250/24;
  (Continued)

(56) References Cited

U.S. PATENT DOCUMENTS 3,252,181 A    5/1966    Hureau
3,317,951 A    5/1967    Hureau
(Continued)

FOREIGN PATENT DOCUMENTS

AU    2015257403    11/2012
CN    103802296    5/2014
(Continued)

*Primary Examiner* — Jeffrey M Wollschlager
(74) *Attorney, Agent, or Firm* — Jacobson Holman PLLC

(57) ABSTRACT

An integral geogrid includes a plurality of interconnected, oriented strands having an array of openings therein that is produced from a coextruded multilayer polymer sheet starting material. By virtue of the construction, the coextruded multilayer sheet components provide a crystalline synergistic effect during extrusion and orientation of the integral geogrid, resulting in enhanced material properties that provide performance benefits to use of the integral geogrid in soil geosynthetic reinforcement.

22 Claims, 14 Drawing Sheets

(51) Int. Cl.

| | | |
|---|---|---|
| *E02D 29/02* | (2006.01) | |
| *B29C 48/21* | (2019.01) | |
| *B29C 48/08* | (2019.01) | |
| *B29C 48/305* | (2019.01) | |
| *B29C 48/16* | (2019.01) | |
| *B29C 48/18* | (2019.01) | |
| *B29C 48/49* | (2019.01) | |
| *B29C 48/495* | (2019.01) | |
| *B29C 55/02* | (2006.01) | |
| *B29C 55/04* | (2006.01) | |
| *B29C 55/12* | (2006.01) | |
| *E02D 3/00* | (2006.01) | |
| *B29C 48/00* | (2019.01) | |
| *B32B 3/26* | (2006.01) | |
| *B32B 27/08* | (2006.01) | |
| *B32B 27/32* | (2006.01) | |

(52) U.S. Cl.
CPC ............. *B29C 48/21* (2019.02); *B29C 48/30* (2019.02); *B29C 48/304* (2019.02); *B29C 48/305* (2019.02); *B29C 48/307* (2019.02); *B29C 48/49* (2019.02); *B29C 48/495* (2019.02); *B29C 55/02* (2013.01); *B29C 55/04* (2013.01); *B29C 55/12* (2013.01); *E02D 3/005* (2013.01); *E02D 17/20* (2013.01); *E02D 29/02* (2013.01); *B29C 48/0018* (2019.02); *B29C 48/185* (2019.02); *B29C 2793/0018* (2013.01); *B32B 3/266* (2013.01); *B32B 27/08* (2013.01); *B32B 27/32* (2013.01); *B32B 2250/03* (2013.01); *B32B 2250/24* (2013.01); *E02D 2300/0084* (2013.01)

(58) Field of Classification Search
CPC ..... B32B 2250/03; B32B 3/266; B32B 27/32; B32B 27/08
See application file for complete search history.

(56) References Cited

U.S. PATENT DOCUMENTS

| | | | |
|---|---|---|---|
| 3,496,965 A | | 2/1970 | Hureau |
| 3,642,967 A | | 2/1972 | Doll |
| 4,374,798 A | * | 2/1983 | Mercer ................ B65D 71/504 264/288.8 |
| 4,470,942 A | | 9/1984 | Beretta |
| 4,536,429 A | | 8/1985 | Mercer |
| 4,574,100 A | * | 3/1986 | Mercer ................ B29D 28/00 428/134 |
| 4,590,029 A | | 5/1986 | Mercer |
| 4,618,385 A | * | 10/1986 | Mercer ................ B32B 27/12 156/229 |
| 4,636,419 A | * | 1/1987 | Madsen ................ B29D 28/00 428/131 |
| 4,743,486 A | | 5/1988 | Mercer et al. |
| 4,756,946 A | | 7/1988 | Mercer |
| 4,808,358 A | | 2/1989 | Beretta |
| 5,053,264 A | | 10/1991 | Beretta |
| 5,156,495 A | * | 10/1992 | Mercer ................ B29D 28/00 405/262 |
| 5,267,816 A | * | 12/1993 | Mercer ................ B29D 28/00 264/291 |
| 5,269,631 A | * | 12/1993 | Mercer ................ B29C 55/04 264/288.4 |
| 5,419,659 A | | 5/1995 | Mercer |
| 5,462,807 A | | 10/1995 | Halle et al. |
| 5,851,089 A | * | 12/1998 | Beretta ................ E02D 17/202 405/259.1 |
| 7,001,112 B2 | * | 2/2006 | Walsh ................ B29C 55/14 405/302.7 |
| 7,241,483 B2 | * | 7/2007 | Ausen ................ A44B 18/0061 24/450 |
| 7,407,699 B2 | * | 8/2008 | Jacoby ................ B29C 55/14 428/136 |
| 2003/0178122 A1 | * | 9/2003 | Ianniello ................ B32B 5/022 156/71 |
| 2004/0062615 A1 | | 4/2004 | Walsh |
| 2005/0043447 A1 | * | 2/2005 | Jacoby ................ B29C 55/14 524/87 |
| 2005/0271861 A1 | * | 12/2005 | Ausen ................ B29C 48/08 428/179 |
| 2005/0288404 A1 | | 12/2005 | Shelton et al. |
| 2007/0172613 A1 | | 7/2007 | Jacoby |
| 2007/0212437 A1 | * | 9/2007 | Wilson ................ B29C 48/908 425/205 |
| 2007/0264468 A1 | | 11/2007 | Boyd et al. |
| 2008/0210359 A1 | | 9/2008 | Halahmi et al. |
| 2009/0003941 A1 | * | 1/2009 | Maggioni ................ B32B 7/14 405/302.7 |
| 2009/0258212 A1 | * | 10/2009 | Jacoby ................ C08L 23/10 428/220 |
| 2010/0189509 A1 | | 7/2010 | Filshill et al. |
| 2010/0254771 A1 | | 10/2010 | Yagi et al. |
| 2012/0202005 A1 | * | 8/2012 | Maggioni ............... B29C 48/13 428/114 |
| 2012/0208417 A1 | * | 8/2012 | Worthington ......... B29C 48/022 442/51 |
| 2012/0251815 A1 | * | 10/2012 | Howells ................ B32B 5/20 428/316.6 |
| 2013/0045353 A1 | * | 2/2013 | Menage ................ B32B 27/32 428/76 |
| 2013/0244522 A1 | * | 9/2013 | Knack ................ D04H 3/045 442/181 |
| 2014/0334998 A1 | | 11/2014 | Wood |
| 2016/0264747 A1 | * | 9/2016 | Brown ................ B29C 48/0012 |

FOREIGN PATENT DOCUMENTS

| | | |
|---|---|---|
| CN | 104277295 | 1/2015 |
| CN | 104277331 | 1/2015 |
| JP | 2004044374 | 2/2004 |
| JP | 2012504058 | 2/2012 |
| KR | 910002887 | 5/1991 |
| WO | WO2006/01230 | 2/2006 |
| WO | WO2006023442 | 3/2006 |

\* cited by examiner

| Applied Moment (cm-kg) | Rotation (degrees) | | | | Rotation | Aperture Stability Modulus (cm-kg/degree) | | |
|---|---|---|---|---|---|---|---|---|
| | Load Cycle 1 | Load Cycle 2 | Load Cycle 3 | Load Cycle 4 | Average (degrees) | Average | Initial | Offset |
| Specimen 1 | | | | | | | | |
| 5 | 2.10 | 1.30 | 1.50 | 1.50 | 1.60 | 3.10 | 3.70 | 3.50 |
| 10 | 4.40 | 2.40 | 2.50 | 2.50 | 2.95 | 3.40 | | |
| 15 | 6.40 | 3.50 | 3.60 | 3.50 | 4.25 | 3.50 | | |
| 20 | 8.10 | 4.50 | 4.60 | 4.50 | 5.43 | 3.70 | | |
| 25 | 9.90 | 5.90 | 5.80 | 5.80 | 6.85 | 3.60 | | |

Average Aperture Stability Modulus (cm-kg/degree)

FIG. 8

| PRODUCT PROPERTIES | TEST METHOD | UNITS | TX160 (spec) MD | TX160 (spec) TD | TX160 (AVG QC) MD | TX160 (AVG QC) TD | 32% BSR 4.6mm sheet MD | 32% BSR 4.6mm sheet TD | 50% BSR 4.6mm sheet MD | 50% BSR 4.6mm sheet TD | Virgin Lab MD | Virgin Lab TD |
|---|---|---|---|---|---|---|---|---|---|---|---|---|
| Characteristics | | | | | | | | | | | | |
| Carbon Black | ASTM 4218 | % | 0.5 | | 0.5 | | 0.5 | | 0.5 | | 0.5 | |
| Unit Weight | ASTM D3376 | kg/m² | 0.223 | | 0.220 | | 0.210 | | 0.214 | | 0.203 | |
| Load Capacity | | | | | | | | | | | | |
| Tensile modulus at .5% Strain | ASTM D6637-01 | lb/ft kN/m | 750.0 | 750.0 | 900.0 | 950.0 | 1135.0 | 1050.0 | 1250.0 | 1200.0 | 1380.0 | 1300.0 |
| Tensile modulus at 2% Strain | ASTM D6637-01 | lb/ft kN/m | na | na | 260.0 | 280.0 | 344.5 | 200.0 | 355.0 | 355.0 | 420.5 | 390.0 |
| Tensile modulus at 5% Strain | ASTM D6637-01 | lb/ft kN/m | na | na | 196.0 | 210.0 | 254.0 | 136.0 | 256.0 | 254.0 | 311.8 | 284.0 |
| Stuctural Integrity | | | | | | | | | | | | |
| Junction Strength | GRI:GG2-87 | lb/ft kN/m | 21.4 | 18.6 | 12.6 | | 15.9 | | 17.6 | | 17.0 | |
| Junction Efficiency | GRI:GG2-87 | % | 93 | | 92 | | 103 | | 119 | | 104 | |
| Junction Strength | GRI:GG2-01 | lb N | 862 | 750 | 563 | | 651 | | 677 | | 707 | |
| Flexural Stiffness (Overall) | ASTM D5732-95 [9] | mg-cm | 575,000 | | 860,000 | | 1,150,939 | | | | | |
| Aperture Stability (Torsional Rigidity) | Kinney-01 | kg-cm/deg | 3.2 | | 3.8 | | na | | 6.2 | | na | |

FIG. 9

| PRODUCT PROPERTIES | TEST METHOD | UNITS | TX140 (spec) MD | TX140 (spec) TD | TX140 (AVG QC) MD | TX140 (AVG QC) TD | SN20140407 3.0mm sheet MD | SN20140407 3.0mm sheet TD | SN20140408 3.0mm sheet MD | SN20140408 3.0mm sheet TD | SN20140409 3.0mm sheet MD | SN20140409 3.0mm sheet TD |
|---|---|---|---|---|---|---|---|---|---|---|---|---|
| Load Capacity | | | | | | | | | | | | |
| Tensile modulus at .5% Strain | ASTM D6637-01 | lb/ft kN/m | | 220.0 | | 300.0 | | 280.0 | | 320.0 | | 300.0 |
| Tensile modulus at 2% Strain | ASTM D6637-01 | lb/ft kN/m | | na | | 230.0 | | 255.0 | | 245.0 | | 250.0 |
| Tensile modulus at 5% Strain | ASTM D6637-01 | lb/ft kN/m | | na | | 176.0 | | 190.0 | | 182.0 | | 180.0 |
| Stuctural Integrity | | | | | | | | | | | | |
| Flexural Stiffness (Overall) | ASTM D5732-95 [9] | mg-cm | 250,000 | | 389,981 | | | | | | | |
| Aperture Stability (Torsional Rigidity) | Kinney-01 | kg-cm/deg | 3.0 | | 4.5 | | na | | na | | na | |

FIG. 10

METHOD OF MAKING AN INTEGRAL GEOGRID FROM A COEXTRUDED MULTILAYERED POLYMER STARTING MATERIAL

CROSS-REFERENCE TO RELATED APPLICATIONS

This application is a divisional application of U.S. application Ser. No. 15/766,960 filed Apr. 9, 2018, as the U.S. National Stage application of International Application No. PCT/US2016/055768, filed Oct. 6, 2016, which claims the benefit of priority to U.S. Provisional Application for Patent No. 62/239,416 filed Oct. 9, 2015.

BACKGROUND OF THE INVENTION

1. Field of the Invention

The present invention relates generally to integral geogrids and other oriented grids used for structural or construction reinforcement and other geotechnical purposes. More particularly, the present invention relates to such integral geogrids made from a coextruded multilayer polymer sheet in order to achieve enhanced stiffness characteristics, as well as other desirable characteristics as disclosed herein.

This invention also relates to the method of producing such integral geogrids. Lastly, the present invention relates to the use of such integral geogrids for soil and particulate reinforcement and methods of such reinforcement.

For the purpose of this invention, the term "integral geogrid" is intended to include integral geogrids and other integral grid structures made by orienting (stretching) a polymeric starting material in the form of a sheet or a sheet-like shape of a requisite thickness and having holes or depressions made or formed therein.

2. Description of the Prior Art

Polymeric integral grid structures having mesh openings defined by various geometric patterns of substantially parallel, orientated strands and junctions therebetween, such as integral geogrids, have been manufactured for over 25 years. Such grids are manufactured by extruding an integrally cast sheet which is subjected to a defined pattern of holes or depressions followed by the controlled uniaxial or biaxial stretching and orientation of the sheet into highly oriented strands and partially oriented junctions defined by mesh openings formed by the holes or depressions. Such stretching and orienting of the sheet in either uniaxial or biaxial directions develops strand tensile strength and modulus in the corresponding stretch direction. These integral oriented polymer grid structures can be used for retaining or stabilizing particulate material of any suitable form, such as soil, earth, sand, clay, gravel, etc. and in any suitable location, such as on the side of a road or other cutting or embankment, beneath a road surface, runway surface, etc.

Various shapes and patterns of holes have been experimented with to achieve higher levels of strength to weight ratio, or to achieve faster processing speeds during the manufacturing process. Orientation is accomplished under controlled temperatures and strain rates. Some of the variables in this process include draw ratio, molecular weight, molecular weight distribution, and degree of branching or cross linking of the polymer.

The manufacture and use of such integral geogrids and other integral grid structures can be accomplished by well-known techniques. As described in detail in U.S. Pat. No. 4,374,798 to Mercer, U.S. Pat. No. 4,590,029 to Mercer, U.S. Pat. No. 4,743,486 to Mercer and Martin, U.S. Pat. No. 4,756,946 to Mercer, and U.S. Pat. No. 5,419,659 to Mercer, a starting polymeric sheet material is first extruded and then punched to form the requisite defined pattern of holes or depressions. The integral geogrid is then formed by the requisite stretching and orienting the punched sheet material Such integral geogrids, both uniaxial integral geogrids and biaxial integral geogrids (collectively "integral geogrids," or separately "uniaxial integral geogrid(s)" or "biaxial integral geogrid(s)") were invented by the aforementioned Mercer in the late 1970s and have been a tremendous commercial success over the past 30 years, totally revolutionizing the technology of reinforcing soils, roadway underpavements and other civil engineering structures made from granular or particulate materials.

Mercer discovered that by starting with a relatively thick, substantially uniplanar polymer starting sheet, preferably on the order of 1.5 mm (0.059055 inch) to 4.0 mm (0.15748 inch) thick, having a pattern of holes or depressions whose centers lie on a notional substantially square or rectangular grid of rows and columns, and stretching the starting sheet either unilaterally or biaxially so that the orientation of the strands extends into the junctions, a totally new substantially uniplanar integral geogrid could be formed. As described by Mercer, "uniplanar" means that all zones of the sheet-like material are symmetrical about the median plane of the sheet-like material.

In U.S. Pat. Nos. 3,252,181, 3,317,951, 3,496,965, 4,470,942, 4,808,358 and 5,053,264, the starting material with the requisite pattern of holes or depressions is formed in conjunction with a cylindrical polymer extrusion and substantial uniplanarity is achieved by passing the extrusion over an expanding mandrel. The expanded cylinder is then slit longitudinally to produce a flat substantially uniplanar starting sheet.

Another integral geogrid is described in U.S. Pat. No. 7,001,112 to Walsh (hereinafter the "Walsh '112 patent"), assigned to Tensar international Limited, an associated company of the assignee of the instant application for patent, Tensar International Corporation, Inc. (hereinafter "Tensar") of Atlanta, Ga. The Walsh '112 patent discloses oriented polymer integral geogrids including a biaxially stretched integral geogrid in which oriented strands form triangular mesh openings with a partially oriented junction at each corner, and with six highly oriented strands meeting at each junction (hereinafter sometimes referred to herein as "triaxial integral geogrid").

It is intended that the present invention be applicable to all integral grids regardless of the method of starting sheet formation or of the method of orienting the starting material into the integral geogrid or grid structure. The subject matter of the foregoing U.S. Pat. Nos. 3,252,181, 3,317,951, 3,496,965, 4,470,942, 4,808,358, 5,053,264 and 7,001,112 is expressly incorporated into this specification by reference as if the disclosures were set forth herein in their entireties. These patents are cited as illustrative, and are not considered to be inclusive, or to exclude other techniques known in the art for the production of integral polymer grid materials.

Traditionally, the polymeric materials used in the production of integral geogrids have been high molecular weight homopolymer or copolymer polypropylene, and high density, high molecular weight polyethylene. Various additives, such as ultraviolet light inhibitors, carbon black, processing aids, etc., are added to these polymers to achieve desired effects in the finished product and/or manufacturing efficiency.

And, also traditionally, the starting material for production of such an integral geogrid has typically been a uniplanar sheet that has a monolayer construction, i.e., a homogeneous single layer of a polymeric material.

While an integral geogrid produced from the above-described conventional starting materials exhibits generally satisfactory properties, it is structurally and economically advantageous to produce an integral geogrid having a relatively higher degree of stiffness suitable for the demands of services such as geosynthetic reinforcement or having other properties desirable for particular geosynthetic applications.

Therefore, a need exists for a starting material not only that is suitable for the process constraints associated with the production of integral geogrids, but also that once the integral geogrid has been produced and is in service, provides a higher degree of stiffness than that associated with conventional geogrid starting materials or provides other desirable properties not available with current monolayer integral geogrids.

SUMMARY OF THE INVENTION

To attain the aforementioned higher degree of stiffness and other desirable characteristics, the present invention employs a coextruded multilayer polymer sheet as the starting material for the fabrication of the integral geogrid.

The experiments described herein support the inventors' theory that by virtue of the inventive construction, the coextruded multilayer sheet components provide a crystalline synergistic effect during extrusion and orientation, resulting in enhanced material properties that provide performance benefits to use of the integral geogrid in soil geosynthetic reinforcement.

According to one embodiment of the present invention, a starting material for making an integral geogrid includes a coextruded multilayer polymer sheet having holes or depressions therein that provide openings when the starting material is uniaxially or biaxially stretched.

According to another embodiment of the present invention, an integral geogrid includes a plurality of highly oriented strands interconnected by partially oriented junctions and having an array of openings therein that is produced from a coextruded multilayer polymer sheet. According to one embodiment of the invention, the integral geogrid is a triaxial integral geogrid.

According to still another embodiment of the present invention, a soil construction includes a mass of particulate material strengthened by embedding therein an integral geogrid produced from a coextruded multilayer polymer sheet.

According to yet another embodiment of the present invention, a method of making a starting material for an integral geogrid includes providing a coextruded multilayer polymer sheet, and providing holes or depressions therein.

According to another embodiment of the present invention, a method of making an integral geogrid includes providing a coextruded multilayer polymer sheet, providing holes or depressions therein, and uniaxially or biaxially stretching the coextruded multilayer polymer sheet having the holes or depressions therein so as to provide a plurality of highly oriented strands interconnected by partially oriented junctions and having an array of the openings therein.

According to one embodiment of the invention, the method produces a triaxial integral geogrid from a coextruded multilayer polymer sheet.

And, according to yet another embodiment of the present invention, a method of strengthening a mass of particulate material includes embedding in the mass of particulate material an integral geogrid produced from a coextruded multilayer polymer sheet.

Accordingly, it is an object of the present invention to provide a starting material for making an integral geogrid. The starting material includes a coextruded multilayer polymer sheet having holes or depressions therein that provide openings when the starting material is uniaxially or biaxially stretched.

Another object of the present invention is to provide an integral geogrid having a plurality of highly oriented strands interconnected by partially oriented junctions and having an array of openings therein that is produced from a coextruded multilayer polymer sheet. An associated object of the invention is to provide an integral geogrid characterized by a higher degree of stiffness, a greater strength, and other desirable characteristics. Specifically, an object of the present invention is to provide a triaxial integral geogrid from a coextruded multilayer polymer sheet.

Still another object of the present invention is to provide a soil construction that includes a mass of particulate material strengthened by embedding therein an integral geogrid produced from a coextruded multilayer polymer sheet.

Yet another object of the present invention is to provide a method of making a starting material for an integral geogrid that includes providing a coextruded multilayer polymer sheet, and providing holes or depressions therein.

Another object of the present invention is to provide a method of making an integral geogrid. The method includes providing a coextruded multilayer polymer sheet, providing holes or depressions therein, and uniaxially or biaxially stretching the coextruded multilayer polymer sheet having the holes or depressions therein so as to provide a plurality of highly oriented strands interconnected by partially oriented junctions and having an array of the openings therein. The method can employ known geogrid fabrication methods, such as those described in the aforementioned U.S. Pat. Nos. 4,374,798, 4,590,029, 4,743,486, 5,419,659, and 7,001,112, as well as in other patents. Specifically, an object of the present invention is to provide a method of making a triaxial integral geogrid from a coextruded multilayer polymer sheet.

And, still another object of the present invention is to provide a method of strengthening a mass of particulate material by embedding in the mass of particulate material an integral geogrid produced from a coextruded multilayer polymer sheet.

These together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

BRIEF DESCRIPTION OF THE DRAWINGS

FIG. 8 is a table summarizing aperture stability modulus properties for an experimental triaxial integral geogrid produced from a 3 mm coextruded uniplanar multilayer sheet starting material such as shown in FIGS. 1-7 to be compared with similar properties of a triaxial integral geogrid commercially available from Tensar as a TriAx® TX140™ geogrid.

FIG. 9 is a table comparing various product properties of triaxial integral geogrids commercially available from Tensar (produced from extruded monolayer sheets) with corresponding various product properties of experimental triaxial integral geogrids as shown in FIGS. 4-7 produced from coextruded uniplanar multilayer sheets according to the present invention.

FIG. 10 is another table comparing various product properties of triaxial integral geogrids commercially available from Tensar (produced from extruded monolayer sheets) with corresponding product properties of experimental triaxial integral geogrids produced from coextruded uniplanar multilayer sheets according to the present invention.

DETAILED DESCRIPTION OF THE PREFERRED EMBODIMENTS

Figure 1:
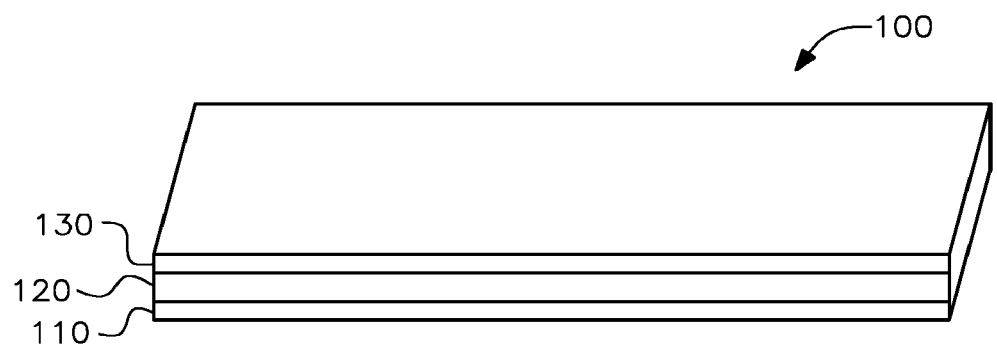
FIG. 1 illustrates a coextruded uniplanar multilayer sheet starting material for an integral geogrid, before holes or depressions are formed therein according to one embodiment of the present invention.

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

And, as used herein, the terms "coextruded," "coextruding," and "coextrusion" are used according to their commonly accepted definition, i.e., pertaining to a single-step process starting with two or more polymeric materials that are simultaneously extruded and shaped in a single die to form a multilayer sheet.

The present invention is directed to uniaxial, biaxial, and triaxial integral geogrid structures produced from a coextruded multilayer polymer sheet as the starting material. The coextruded multilayer polymer sheet starting material can be, for example, uniplanar, or can be non-uniplanar, depending upon the particular characteristics that are desired for the multilayer geogrid structure that is to be fabricated therefrom. According to a preferred embodiment of the invention, the coextruded multilayer polymer sheet starting material is uniplanar or substantially uniplanar.

The invention is based on the fact that extrusion of the coextruded multilayer sheet consisting of different polymeric materials or other extrudable materials at varying percentage content when converted to uniaxial, biaxial, and/or triaxial integral geogrids via a sheet punching and oven stretching process, produces a finished product that has unique characteristics relative to the traditional uniaxial, biaxial, and triaxial geogrids for purposes of soil reinforcement and other geotechnical applications.

FIG. 1 illustrates a coextruded multilayer sheet 100 used as a starting material for an integral geogrid according to one embodiment of the present invention, before the sheet has been through-punched or depressions formed therein.

As shown in FIG. 1, the coextruded multilayer sheet 100 is a three-layer sheet embodiment of the invention. That is, preferably, sheet 100 includes a first layer 110, a second layer 120, and a third layer 130. The first layer 110 and the third layer 130 are arranged on opposite planar surfaces of second layer 120, preferably in a uniplanar or substantially uniplanar configuration. Further, while the three-layer configuration of sheet 100 is shown for purposes of illustration, the invention contemplates the use of a sheet having multiple layers arranged in various configurations, multiple layers having various combinations of thicknesses, and multiple layers having various materials of construction, all as dictated by the particular application in which the integral geogrid is to be employed. For example, while the three-layer configuration of sheet 100 is shown for purposes of illustration, the invention also contemplates the use of coextruded sheets having more than three layers. In general, the layer configuration, the layer thicknesses, and the materials of construction of the layers are selected to provide not only ease of fabrication of the integral geogrid, but also an integral geogrid having the desired degree of stiffness and other performance properties.

As described above, the coextruded multilayer sheet 100 used as the starting material for an integral geogrid according to the present invention is preferably through-punched, although it may be possible to use depressions formed therein instead. According to the embodiment of the starting material in which depressions are formed in the sheet, the depressions are provided on each side of the sheet, i.e., on both the top and the bottom of the sheet. Further, the depressions extend into each layer of the coextruded multilayer sheet.

In the particular embodiment of the invention shown in FIG. 1, the sheet 100 is made by coextruding a first material that forms the first layer 110, a second material that forms the second layer 120, and a third material that forms the third layer 130 in a manner known to those skilled in the art of extruding multi-layer sheets.

According to a preferred embodiment of the invention, the overall thickness of the sheet 100 is from about 2 mm to about 12 mm and, according to a more preferred embodiment of the invention, the overall thickness of the sheet 100 is from about 2 mm to about 6 mm.

With regard to the individual thicknesses of the sheet layers, according to a preferred embodiment of the invention, the thickness of the first layer 110 is from about 0.5 mm to about 4.5 mm, the thickness of the second layer 120 is from about 1 mm to about 9 mm, and the thickness of the third layer 130 is from about 0.5 mm to about 4.5 mm, keeping in mind that the overall thickness of the sheet 100 is from about 2 mm to about 12 mm. And, according to a more preferred embodiment of the invention, the thickness of the first layer 110 is from about 0.5 mm to about 2 mm, the thickness of the second layer 120 is from about 2 mm to about 5 mm, and the thickness of the third layer 130 is from about 0.5 mm to about 2 mm.

In general, the material of construction of the first layer 110, the second layer 120, and the third layer 130 may be the same as each other, or may be different from one another. Preferably, the material of construction of the first layer 110 and the material of construction of the third layer 130 may be the same as each other, or may be different from one another. More preferably, material of construction of the second layer 120 is different from the material of construction of both the first layer 110 and the material of construction of the third layer 130.

And, in general, the layers of the sheet are polymeric in nature. For example, the materials of construction may include high molecular weight polyolefins, and broad specification polymers. Further, the polymeric materials may be virgin stock, or may be recycled materials, such as, for example, post-industrial or post-consumer recycled polymeric materials. And, the use of one or more polymeric layers having a lower cost than that of the aforementioned high molecular weight polyolefins and broad specification polymers is also contemplated. The use of such a lower cost polymeric layer may result in a cost savings of approximately 20% to approximately 30% relative to the use of, for example, a polypropylene layer.

According to a preferred embodiment of the invention, the material of construction of the first layer 110 and the third layer 130 is a high molecular weight polyolefin, such as, for example, a polypropylene ("PP"). And, according to the same preferred embodiment, the material of construction of the second layer 120 is a broad specification polymer, such as, for example, a virgin PP, or a recycled PP, such as, for example, a post-industrial PP or other recycled PP. However, depending upon the particular application of the integral geogrid, polymeric components having a material of construction other than polypropylene may be included in the coextruded multilayer sheet.

Figure 2:
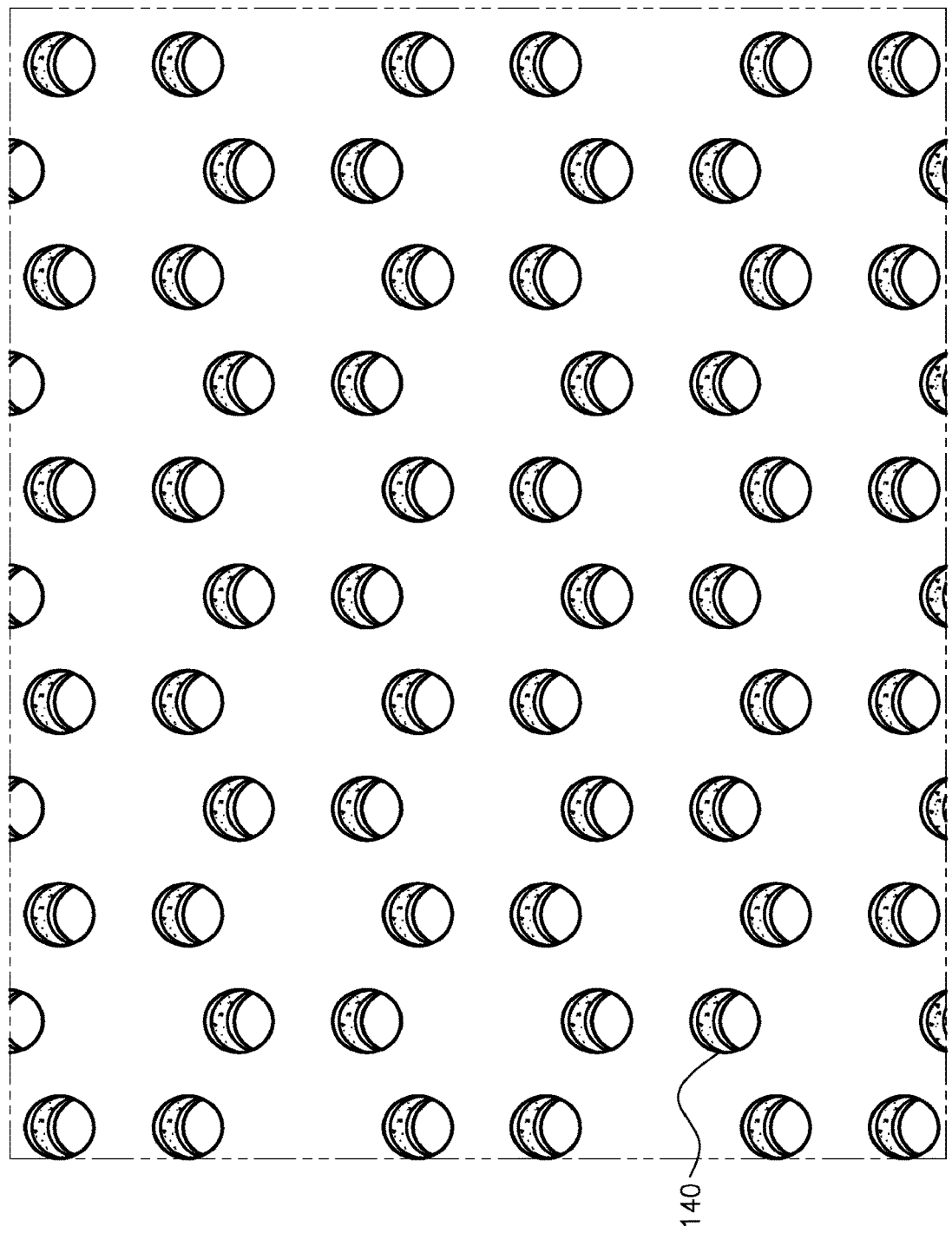
FIG. 2 is a perspective plan view of the starting material sheet shown in FIG. 1 that has the holes punched therein for forming a triaxial integral geogrid of the type shown in the Walsh '112 patent.
Figure 3:
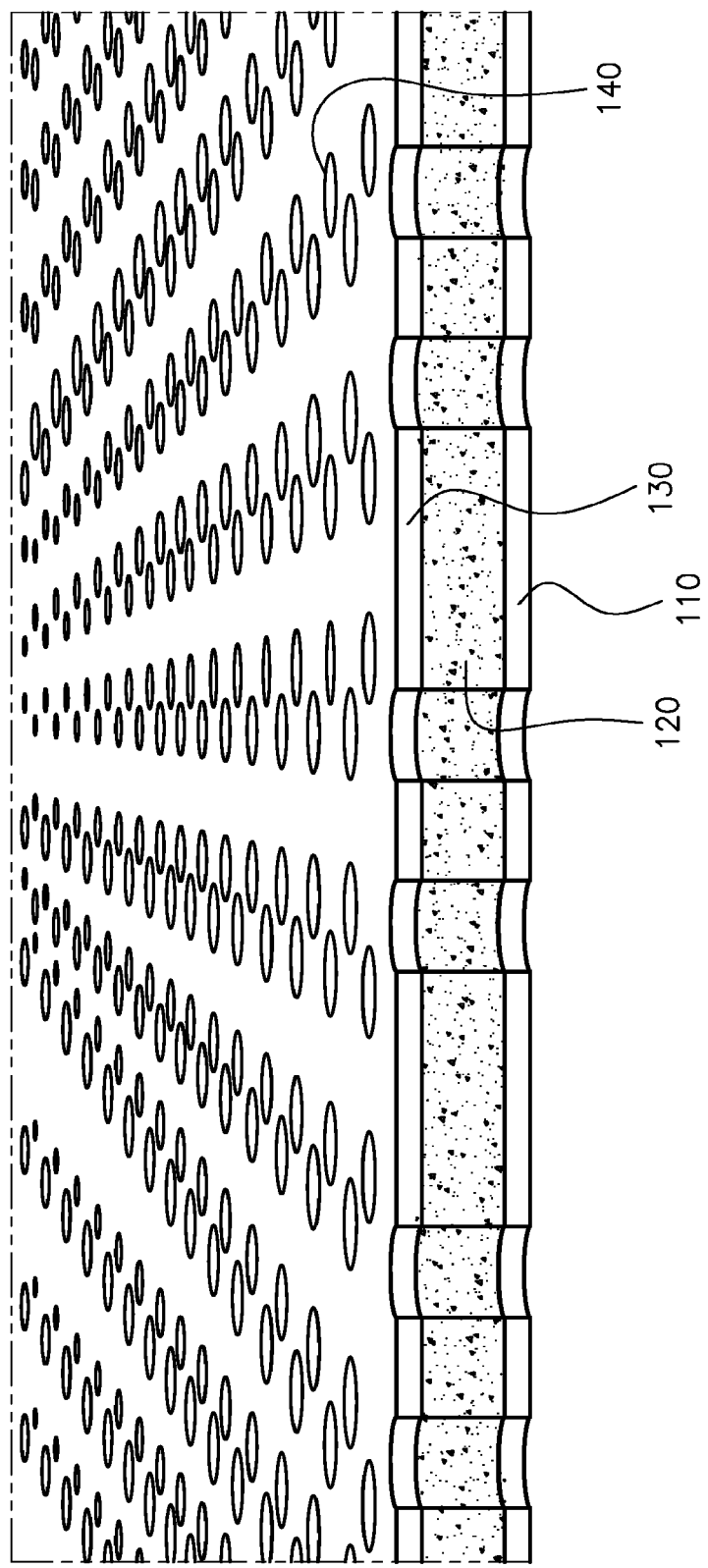
FIG. 3 is a side view of a section of the starting material sheet shown in FIG. 2.
Figure 4:
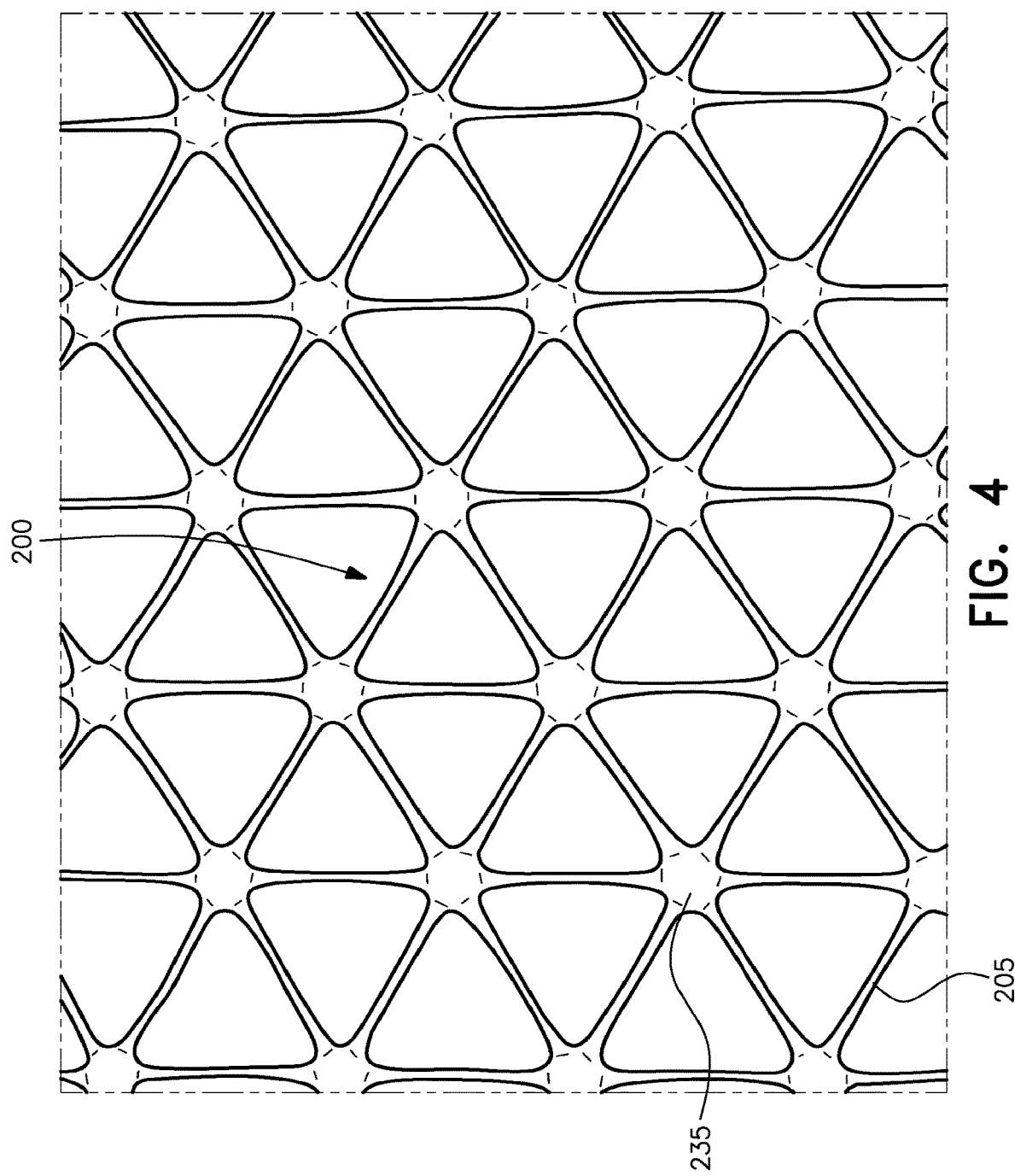
FIG. 4 is a plan view of a section of the triaxial integral geogrid produced by biaxially orienting the starting material sheet shown in FIG. 2.
Figure 5:
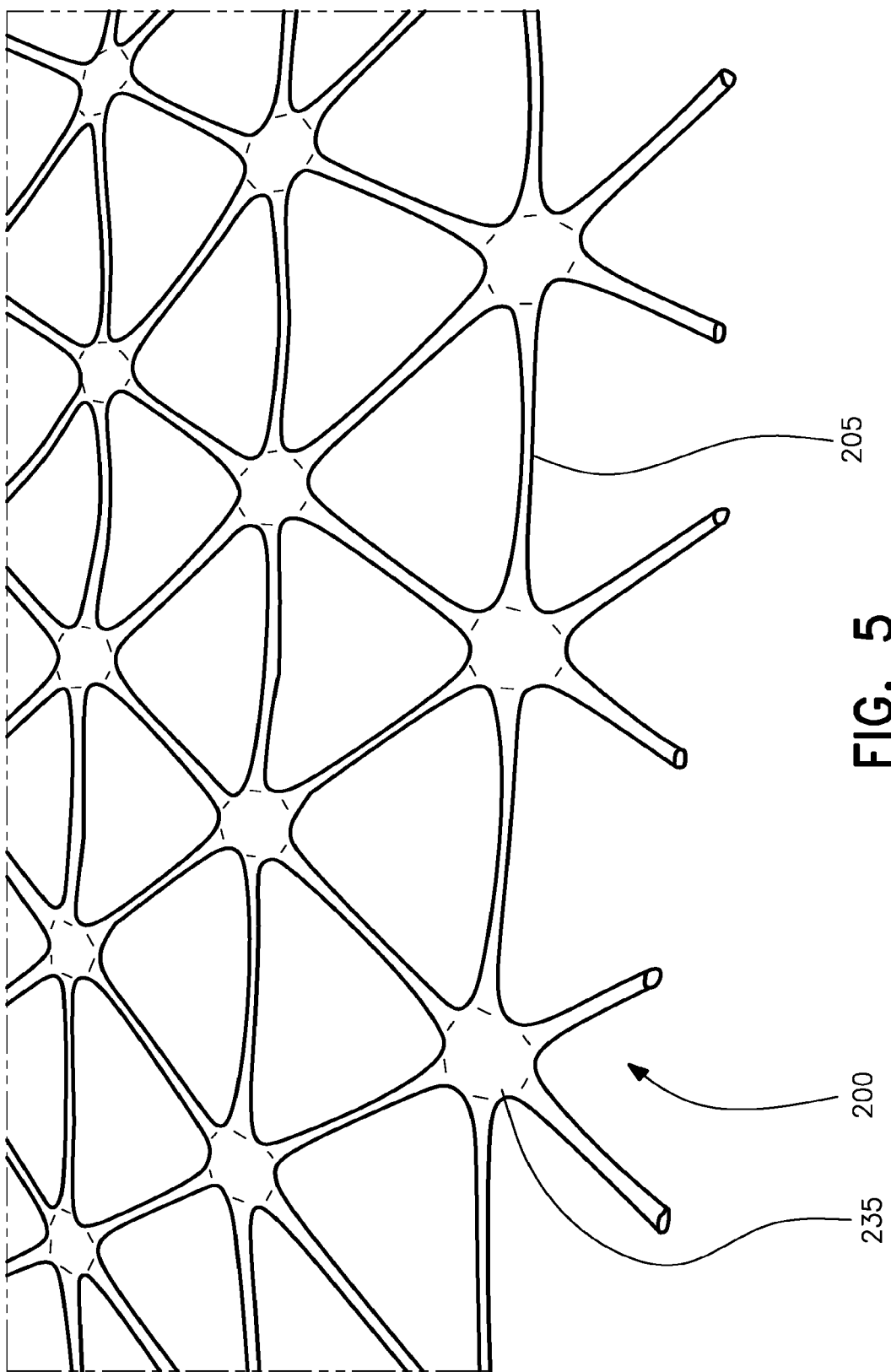
FIG. 5 is a perspective view of the section of the triaxial integral geogrid shown in FIG. 4.
Figure 6:
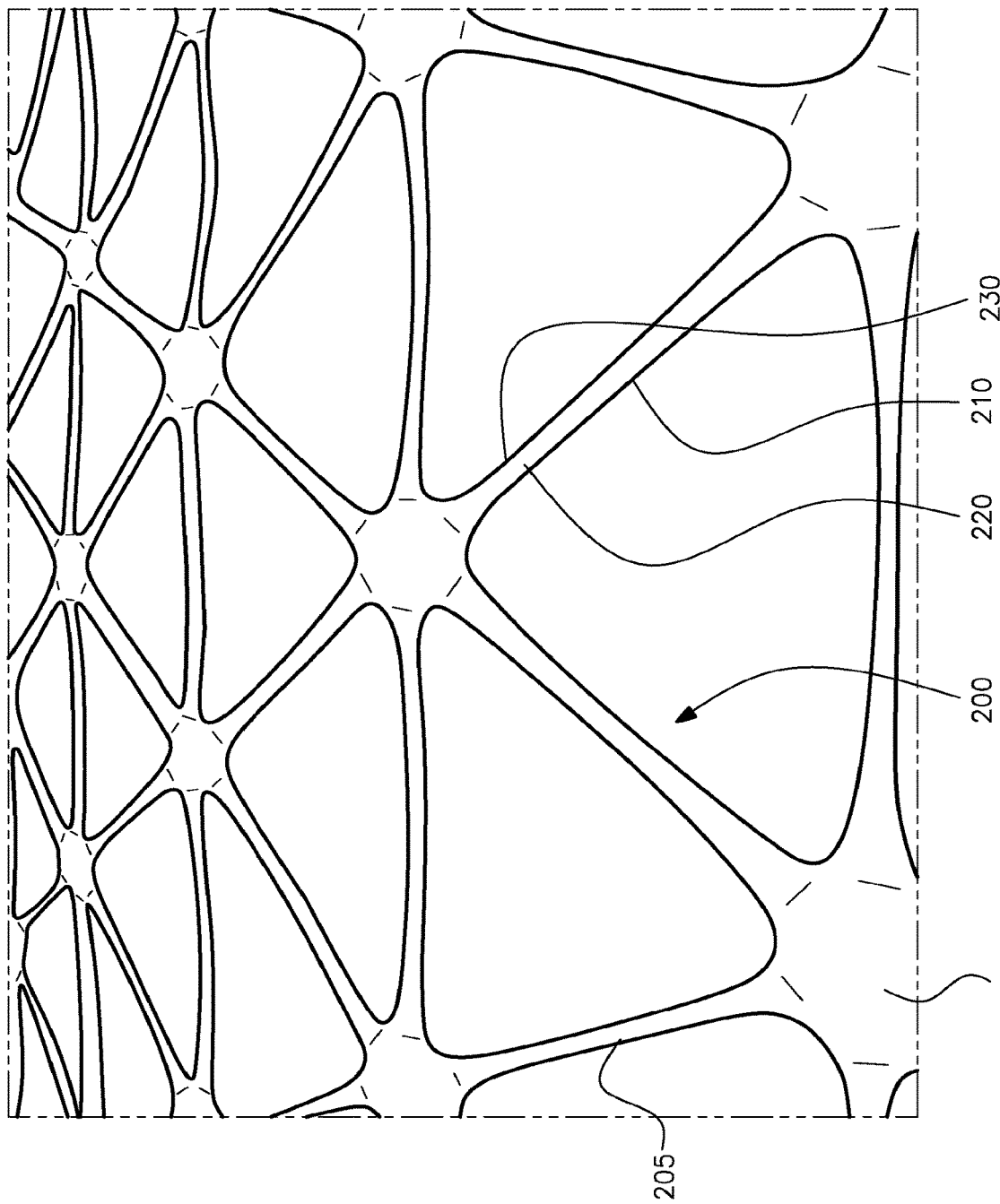
FIG. 6 is an enlarged perspective view of the section of the triaxial integral geogrid shown in FIG. 4.

FIGS. 2 and 3 illustrate the coextruded multilayer sheet starting material 100 of FIG. 1 that has holes 140 punched therein for forming the triaxial integral geogrid 200 shown in FIGS. 4, 5, and 6. The size and spacing of the holes 140 are as disclosed in the Walsh '112 patent. The triaxial integral geogrid 200 includes highly oriented strands 205 and partially oriented junctions 235, also as disclosed in the Walsh '112 patent. The upper layer 130 of the starting material 100 has been stretched and oriented into the upper layer 230 of the strands 205 and junctions 235. Similarly, the third or lower layer 110 of the starting material 100 has been stretched and oriented into the lower or underneath layer 210 of the strands 205 and junctions 235. As the first layer 130 and third layer 110 are being stretched and oriented, the second or middle layer 120 is also being stretched and oriented into middle layer 220 of both the strands 205 and junctions 235.

Figure 7:
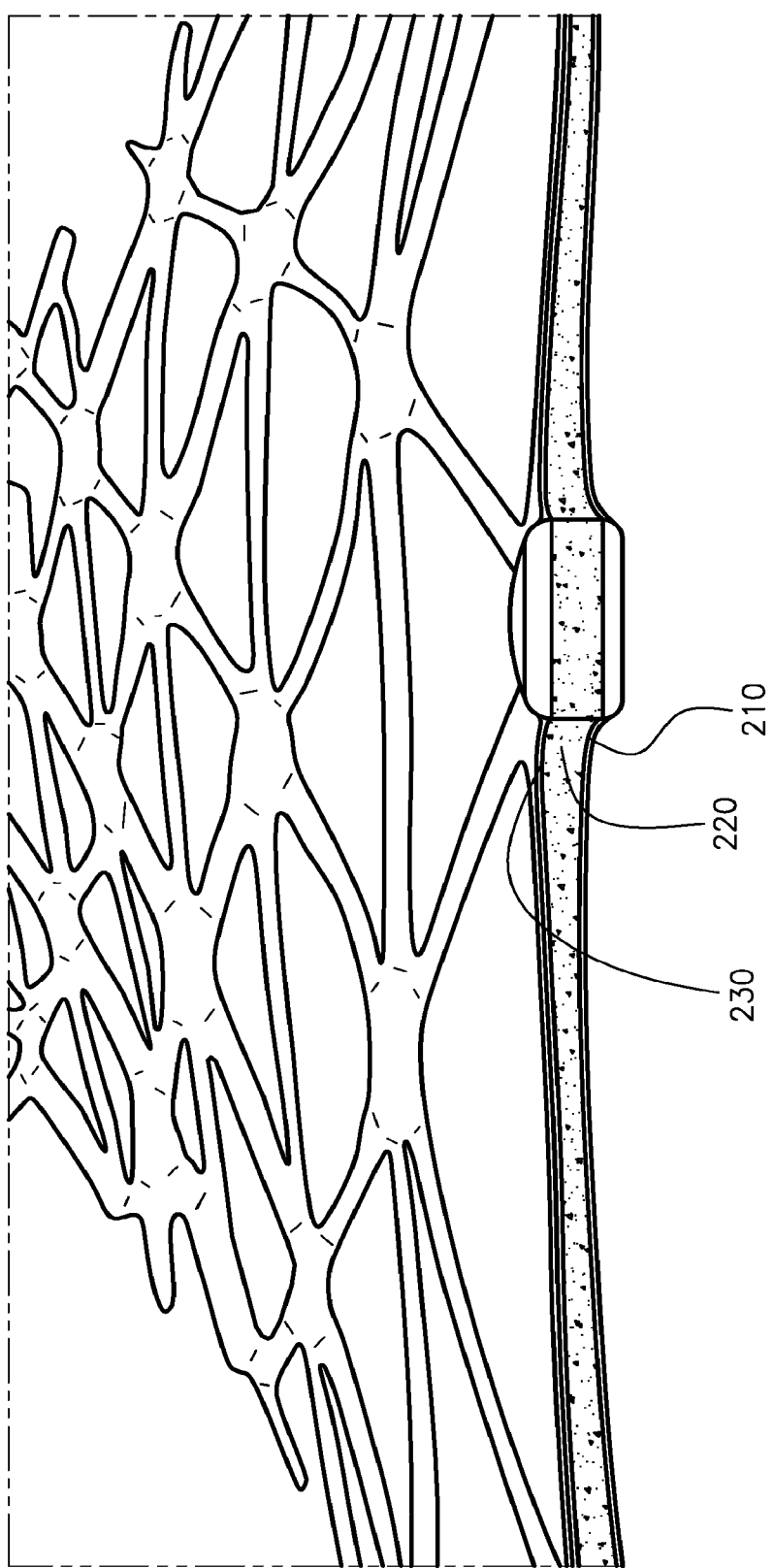
FIG. 7 is a side cross-sectional view of the section of the triaxial integral geogrid shown in FIG. 4.

As indicated above, FIG. 7 is a side cross-sectional view of the section of the triaxial integral geogrid shown in FIG. 4. And, as is evident from FIG. 7, the strand 205 has what is known to one skilled in the art as a high aspect ratio, i.e., a ratio of the thickness or height of the strand cross section to the width of the strand cross section that is greater than 1.0. Such a high aspect ratio structure is disclosed in U.S. Pat. No. 9,556,580 to Walsh and in U.S. Pat. No. 10,024,002 to Walsh, both of which are assigned to Tensar Technologies Limited, another associated company of the assignee of the instant application for patent. The subject matter of the foregoing U.S. Pat. Nos. 9,556,580 and 10,024,002 is expressly incorporated into this specification by reference as if the disclosures were set forth herein in their entireties.

The invention also relates to a method of making the above-described triaxial integral geogrid 200. The method includes: providing the coextruded multilayer polymer sheet 100; forming a plurality of holes or depressions in the coextruded multilayer polymer sheet 100 in a selected pattern, such as in accordance with the disclosure of the Walsh '112 patent; and biaxially stretching and orienting the coextruded multilayer polymer sheet having the patterned plurality of holes or depressions therein to form an integral geogrid having a plurality of interconnected, oriented strands between partially oriented junctions and to configure the holes or depressions as grid openings.

In general, once the coextruded multilayer polymer sheet 100 has been prepared with holes or depressions, the triaxial integral geogrid 200 can be produced from the sheet 100 according to the methods described in the above-identified patents and known to those skilled in the art.

To demonstrate the enhanced characteristics and properties of the inventive integral geogrid produced from the coextruded multilayer sheet, comparative tests were performed.

FIG. 8 is a table summarizing aperture stability modulus properties for an experimental triaxial integral geogrid produced from a 3 mm coextruded sheet starting material to be compared with similar properties of a triaxial integral geogrid commercially available from Tensar as a TriAx® TX140™ geogrid. The experiment was performed according to the testing protocols of ASTM D7864, i.e., the "Standard Test Method for Determining the Aperture Stability Modulus of Geogrids." The aperture stability testing was performed on triaxial integral geogrid samples made from a 3 mm thick coextruded multilayer sheet that included a 50% BSR ("broad specification resin") that had been punched and stretched. The first, i.e., lower, layer 110 of the coextruded multilayer sheet had a material of construction of a high molecular weight polypropylene (PP) and a thickness of 0.75 mm; the second, i.e., middle, layer 120 had a material of construction of a broad specification PP and a thickness of 1.50 mm; and the a i.e., upper, layer 130 had a material of construction of a high molecular weight PP and a thickness of 0.75 mm.

For the experimental laboratory-prepared triaxial integral geogrid made from the coextruded multilayer sheet, the average value for a moment of 20 cm-kg was 3.70 cm-kg/deg. Conversely, or the non-coextruded, i.e., monolayer sheet, specifically from six tests of the standard Triax® TX140™ geogrids, the average value of the tests was 2.86 cm-kg/deg, with a range of 2.52 to 3.14 cm-kg/deg, substantially below the average value recorded for the experimental multilayer samples.

FIG. 9 also illustrates various product properties of triaxial integral geogrids produced from monolayer extruded sheets with corresponding product properties of triaxial integral geogrids produced from coextruded multilayer sheets according to the present invention. In the tests summarized in FIG. 9, the monolayer sheets were processed to have the configuration of the triaxial integral geogrid described in the Walsh '112 patent. Such a triaxial integral geogrid is commercially available from Tensar, and is known as the TriAx® TX160™ geogrid.

For the comparative experiments shown in FIG. 9, coextruded 3-layer sheets in 4.6 mm finished sheet thicknesses were prepared. The various sheets incorporated different loadings of post-industrial polypropylene (PP) content, and each of the coextruded 3-layer sheets was then processed into a triaxial integral geogrid comparable to Tensar's TriAx® TX160™ geogrid.

With regard to FIG. 9, each of the 4.6 mm coextruded multilayer sheets included the following layer compositions: Sample (1) a first or upper layer 130, as described above, of 34% virgin polypropylene (PP) and black masterbatch ("MB," i.e., black carbon to provide a black color to the product for UV protection)/a second or middle layer 120, as described above, of 32% post-industrial PP/and a third or lower layer 110, as described above, of 34% virgin PP and MB; and Sample (2) 25% virgin PP and MB/50% post-industrial PP/25% virgin PP and MB.

The thickness of each of the above-described layers for the various sheet Samples (1) and (2) is as follows. For the 4.6 mm multilayer sheet Sample (1), the thicknesses of the layers were, respectively: 1.56 mm/1.47 mm/1.56 mm. For the 4.6 mm multilayer sheet Sample (2), the thicknesses of the layers were, respectively: 1.15 mm/2.30 mm/1.15 mm.

As is evident from the results presented in FIG. 9, the resultant experimental triaxial integral geogrids produced from the above-described punched and oriented 4.6 mm coextruded 3-layer sheet samples resulted in a product, versus the standard monolayered Triax® TX160™ geogrid with the approximate equivalent starting sheet thickness (4.7 mm), that exhibited substantially higher product stiffness as measured per standard Tensar low strain tensile modulus testing, flexural stiffness testing, and aperture stability testing. The 0.5% and 2.0% strain tensile modulus test values were more than 30% stronger for the experimental triaxial geogrids produced from the 4.6 mm coextruded 3-layer starting sheet than from the conventional Triax® TX160™ geogrids produced from the 4.7 mm monolayered sheet. Similarly, the flexural stiffness measured more than 33% higher for the experimental triaxial geogrids produced from the 4.6 mm coextruded sheet than the standard Triax® TX160™ geogrid made from a 4.7 mm monolayered starting sheet.

FIG. 10 is another table comparing various product properties of triaxial integral geogrids produced from monolayer sheets commercially available from Tensar with corresponding product properties of experimental triaxial integral geogrids produced from coextruded multilayer sheets according to the present invention. In the tests summarized in FIG. 10, the monolayer sheets were also processed to have the configuration of the triaxial integral geogrid described in the Walsh '112 patent. Such a triaxial integral geogrid is commercially available from Tensar, and is known as the TriAx® TX140™ geogrid.

For the comparative experiments shown in FIG. 10, coextruded 3-layer sheets in 3.0 mm finished sheet thicknesses were prepared. The various sheets incorporated different loadings of post-industrial polypropylene (PP) content, and each of the coextruded 3-layer sheets was then processed into a triaxial integral geogrid comparable to Tensar's TriAx® TX140™ geogrid.

With regard to FIG. 10, Sheet "SN20140407" had the following composition: 32% broad specification resin in the second (i.e., middle) layer 120 and 34% high molecular weight PP in the first (i.e. top) layer 130 and in the third (i.e., lower) layer 110. Sheet "SN20140408" had the following composition: 50% broad specification resin in the second (i.e., middle) layer, and 25% high molecular weight PP in the first layer and in the third layer. Sheet "SN20140409" had the following composition: 60% broad specification resin in the second (i.e., middle) layer, and 20% high molecular weight PP in the first layer and in the third layer.

The thickness of each of the above-described layers for Sheet SN20140407, Sheet SN20140408, and Sheet SN20140409 is as follows. For the 3 mm multilayer Sheet SN20140407, the thicknesses of the first, the second, and the third layers were, respectively: 1.02 mm/0.96 mm/1.02 mm. For the 3 mm multilayer Sheet SN20140408, the thicknesses of the layers were, respectively: 0.75 mm/1.5 mm/0.75 mm. For the 3 mm multilayer Sheet SN20140409, the thicknesses of the layers were, respectively: 0.6 mm/1.8 mm/0.6 mm.

As is evident from the results reported in FIG. 10, the 3.0 mm starting sheet thickness with post-industrial PP content of 32% (SN20140407), 50% (SN20140408), and 60% (SN20140409), when converted to a finished triaxial integral geogrid, exceeded the only specified tensile modulus test for Triax® TX140™ geogrid produced from a 3.7 mm thick sheet which is 220 kN/m in the transverse direction ("TD"). FIG. 10 also shows that each of the coextruded samples, starting with the thinner 3.0 mm sheet, met or exceeded the average tensile modulus values of standard Triax® TX140™ geogrid produced from a 3.7 mm sheet.

Again, the experiments described herein support the inventors' concept that by virtue of utilizing a multi-layer construction for the starting material sheet, the coextruded multilayer sheet components can provide a crystalline synergistic effect during extrusion and orientation, thus providing enhanced material properties in the resultant integral geogrid and performance benefits when using the resultant integral geogrid in soil and other geotechnical applications.

Other possible embodiments of the instant invention can include, for example, (1) multilayer coextruded polymer sheet starting materials having significantly higher levels of post-industrial and post-consumer PP resins, i.e., PP resins that have a relatively low cost, (2) foaming agents to provide a foamed or expanded second (i.e., middle) layer, (3) one or more relatively low cost layers that include bulking agents or fillers, (4) a color identification layer within the integral geogrid, and (5) a 3-layer coextruded polymer sheet with HDPE outer layers and an amorphous and crystalline polyester inner layer sandwiched therebetween. Each of the above examples would provide an enhancement or satisfy a need for an integral geogrid having enhanced geosynthetic aggregate reinforcement, cost reduction and/or identification properties.

Figure 11:
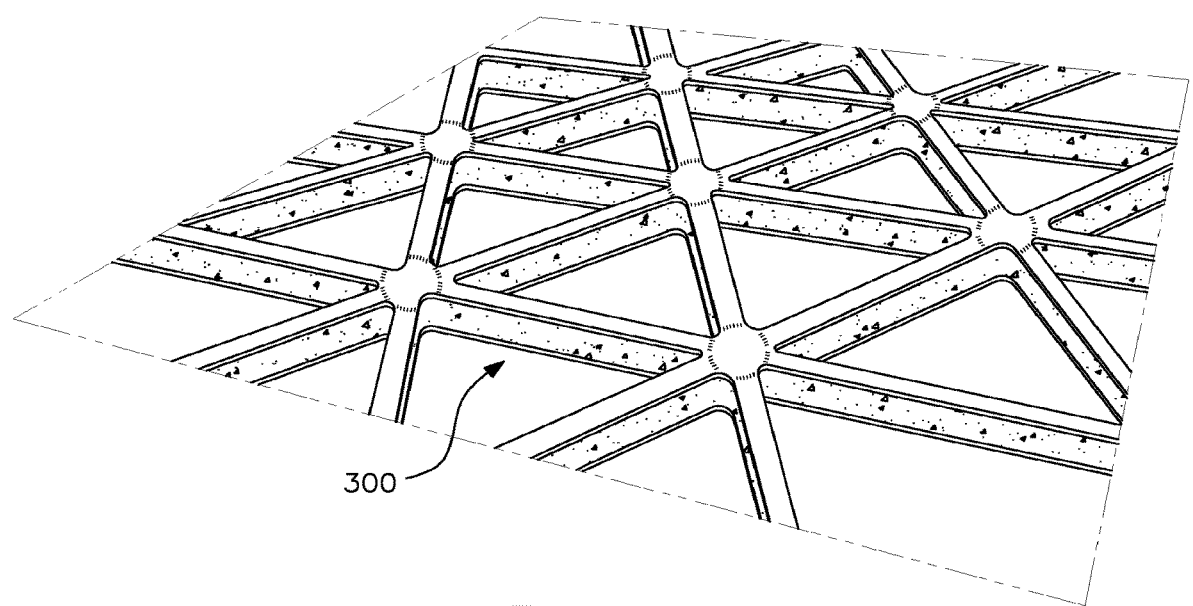
FIG. 11 is a perspective view of a section of a triaxial integral geogrid according to another embodiment of the present invention.
Figure 12:
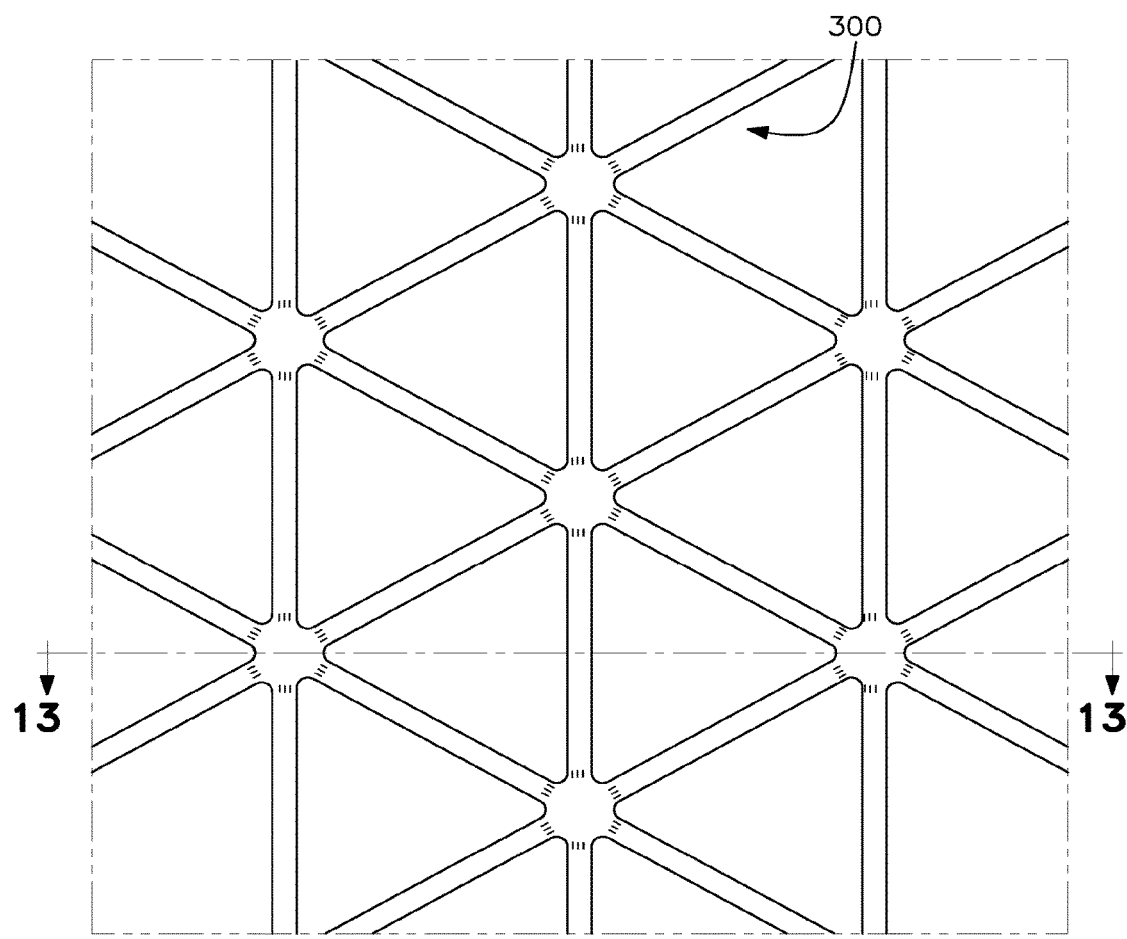
FIG. 12 is a plan view of the section of the triaxial integral geogrid shown in FIG. 11.
Figure 13:
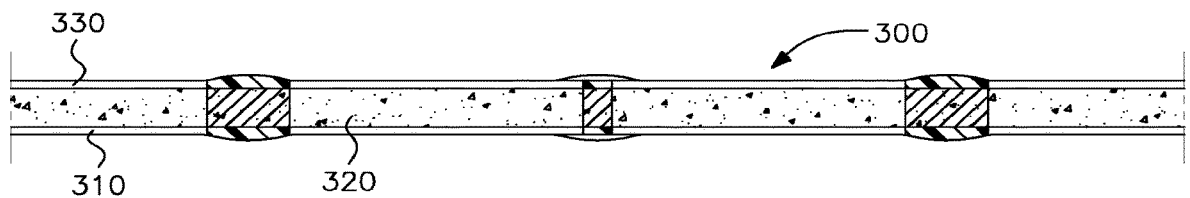
FIG. 13 is a side cross-sectional view of the section of the triaxial integral geogrid shown in FIG. 11.

More specifically, as indicated above, one possible embodiment of the instant invention could include the use of a foaming agent to provide a foamed or expanded second or middle layer. FIGS. 11, 12, and 13 are directed to such an embodiment 300, in which the second or middle layer (here designated as 320) of the coextruded multilayer sheet forms an expanded or "foamed" structure. That is, according to this embodiment of the invention, a chemical foaming agent is mixed with the polymer that is extruded to form the second layer. The heat that is generated to melt the polymer decomposes the chemical foaming agent, which results in the liberation of a gas. The gas is then dispersed in the polymer melt, and expands upon exiting the die. As a result, the second layer is expanded or foamed (see FIG. 13, which is a side cross-sectional view of the section of the integral triaxial geogrid shown in FIG. 11.)

According to this embodiment of the invention, as with the above-described first embodiment, the material of construction of the first layer (here, 310) and the material of construction of the third layer (here, 330) may be the same as each other, or may be different from one another, although the same material is preferred. In general, the material of construction of the second layer 320 is different from the material of construction of both the first layer 310 and the material of construction of the third layer 330.

Advantages of the foamed embodiment of the finished integral geogrid according to the present invention not only include reduced raw material cost and reduced geogrid weight, but also may include desirable physical and chemical properties of the foamed layer per se.

As indicated above, one possible embodiment of the instant invention could include the use of a color identification layer with the integral geogrid. For example, the American Association of State Highway and Transportation Officials ("AASHTO") requires, in conjunction with the National Transportation Product Evaluation Program ("NTPEP"), a product marker for geosynthetic reinforcements associated with walls, slopes, and fills over soft ground.

The above-described color identification layer could be, for example, a polymeric layer having a color that differs from the color of an adjacent, or an associated, co-extruded layer. The color identification layer could be an inner layer or an outer layer of the integral geogrid, or the integral geogrid could include multiple color identification layers of either the same color or a variety of colors. The color identification layer could be a solid color, or could have a pattern, such as incorporating a stripe. The color and/or chemistry of the color identification layer is selected, of course, based upon the requirements of a particular application of the integral geogrid.

In addition to the above-described use of the integral geogrid's color identification layer for compliance with AASHTO and NTPEP standards, the color identification layer can also serve to provide source identification of the integral geogrid.

As indicated above, while the three-layer configuration of sheet 100 has been shown for purposes of illustration, the invention also contemplates the use of coextruded sheets having more than three layers.

Figure 14:
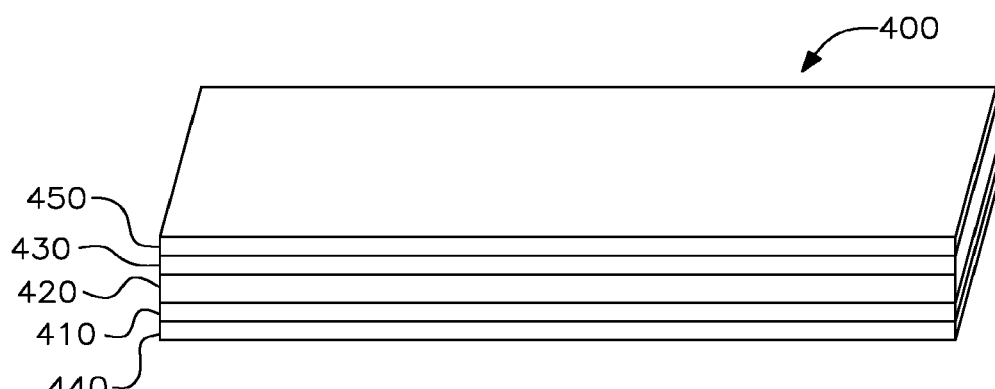
FIG. 14 illustrates a coextruded uniplanar multilayer sheet starting material for an integral geogrid, before holes or depressions are formed therein according to another embodiment of the present invention.

For example, the coextruded sheet can be a five-layer configuration, such as sheet 400 shown in FIG. 14. Sheet 400 includes a middle layer 420, a first inner layer 410, a second inner layer 430, a first outer layer 440, and a second outer layer 450. The first inner layer 410 and the second inner layer 430 are arranged on opposite planar surfaces of middle layer 420, preferably in a uniplanar or substantially uniplanar configuration. The first outer layer 440 and the second outer layer 450 are arranged on opposite planar surfaces of, respectively, first inner layer 410 and second inner layer 430, preferably in a uniplanar or substantially uniplanar configuration.

In the particular embodiment of the invention shown in FIG. 14, the sheet 400 is made by coextruding a first material that forms the middle layer 420, a second material that forms the first inner layer 410, a third material that forms the second inner layer 430, a fourth material that forms the first outer layer 440, and a fifth material that forms the second outer layer 450, in a manner known to the those skilled in the art of extruding multi-layer sheets.

In general, the material of construction of the middle layer 420, the first inner layer 410, the second inner layer 430, the first outer layer 440, and the second outer layer 450 may be the same as each other, or may be different from one another. For example, the middle layer 420 may have a first material of construction, the first inner layer 410 and the second inner layer 430 may have a second material of construction, and the first outer layer 440 and the second outer layer 450 may have a third material of construction. In summary, depending upon the particular service application in which the integral geogrid made from the sheet 400 is to be employed, various combinations of materials of construction for the above-described five layers may be used.

Figure 15:
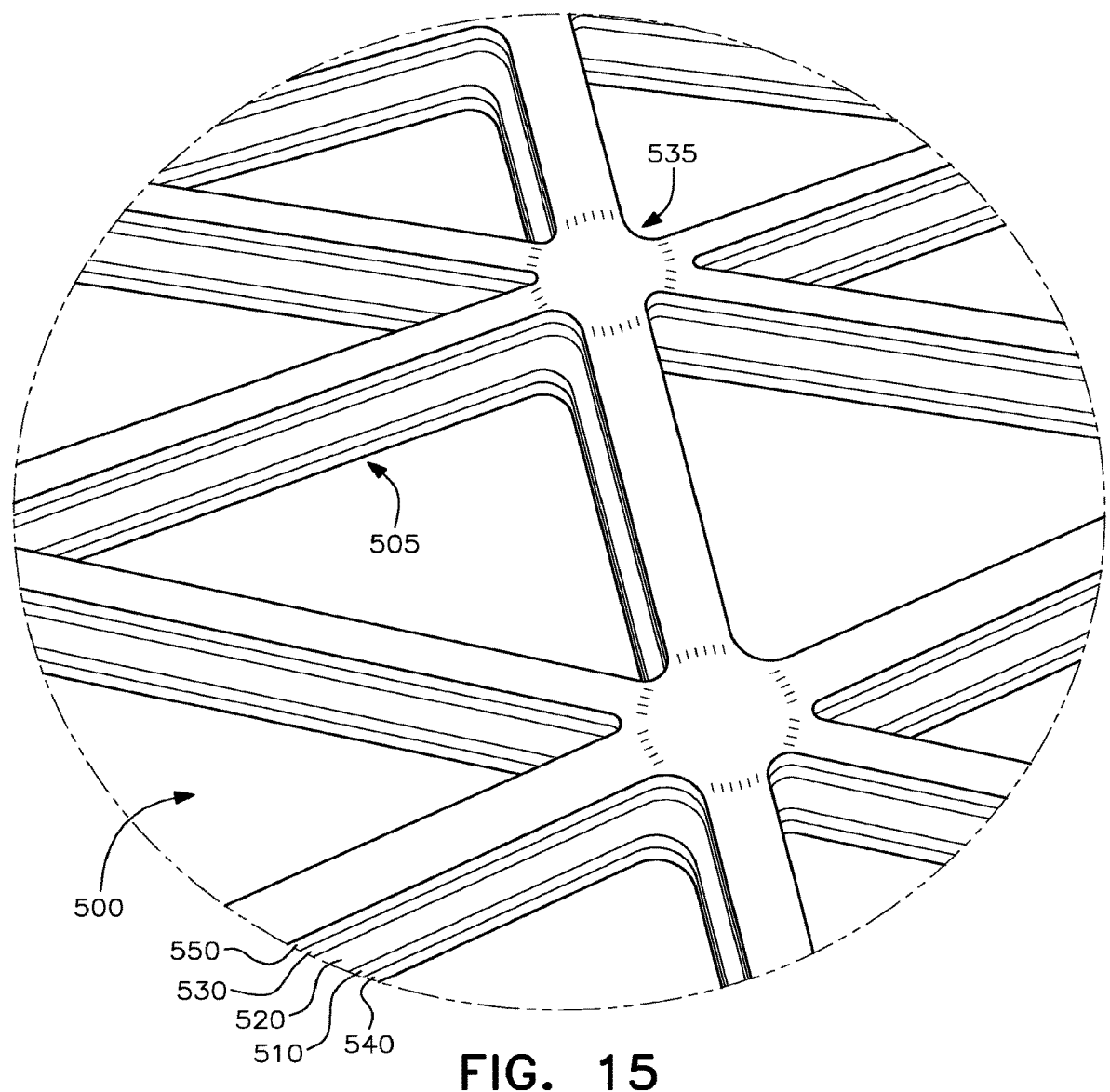
FIG. 15 is a perspective view of a section of a triaxial integral geogrid associated with the starting material sheet shown in FIG. 14.

FIG. 15 is a perspective view of a section of a triaxial integral geogrid 500 associated with the starting material sheet 400 shown in FIG. 14. The triaxial integral geogrid 500 includes highly oriented strands 505 and partially oriented junctions 535. After holes have been punched in sheet 400, the first outer layer 440 and the second outer layer 450 of sheet 400 have been stretched and oriented into, respectively, the first outer layer 540 and the second outer layer 550 of the strands 505 and junctions 535. Similarly, the first inner layer 410 and the second inner layer 430 of sheet 400 have been stretched and oriented into, respectively, the first inner layer 510 and the second inner layer 530 of the strands 505 and junctions 535. And, as the first outer layer 440 and the second outer layer 450, and the first inner layer 410 and the second inner layer 430 are being stretched and oriented, the middle layer 420 is also being stretched and oriented into middle layer 520 of both the strands 505 and junctions 535.

As also indicated above, one possible embodiment of the instant invention could include the use of one or more relatively low cost layers that include bulking agents or fillers. The inclusion of such bulking agents or fillers in the layers of the integral geogrid create a product having a thicker, i.e., loftier, profile, which can lead to enhanced performance of the integral geogrid in certain service applications. Depending upon the service application in which the integral geogrid is to be employed, such bulking agents or fillers, may include, for example, one or more of $CaCO_3$ (calcium carbonate), talc, $CaSiO_3$ (wollastonite), nano-fillers, multi-wall carbon nanotube ("MWCNT"), single wall carbon nanotube ("SWCNT"), glass fibers, and aluminum hydrate.

As described earlier above, the use of one or more polymeric layers having a lower cost than that of high molecular weight polyolefins and broad specification polymers is contemplated. In an embodiment in which such a lower cost polymeric layer also includes the aforementioned bulking agent or filler, a cost savings of approximately 20% relative to the use of, for example, a polypropylene layer, may result.

And, of course, use of the above-described foam layer can also create a product having a thicker, i.e., loftier, profile, which can also lead to enhanced performance of the integral geogrid in certain service applications. Contemplated embodiments of the invention include those in which one or more of the foamed layers are used in conjunction with one or more layers that include the bulking agents or fillers.

In general, the instant invention is based on employing the coextrusion techniques and materials described herein to modify and enhance certain physical, chemical, and/or mechanical properties of an integral geogrid so as to improve the performance of the integral geogrid in a particular application thereof.

The foregoing is considered as illustrative only of the principles of the invention. Further, since numerous modifications and changes may readily occur to those skilled in the art, it is not desired to limit the invention to the exact construction and operation described and shown.

What is claimed is:

1. A method of making an integral geogrid, comprising:
providing, via a single coextrusion, a coextruded multilayer polymer starting sheet having at least coextruded first, second, and third layers of polymeric materials, the coextruded multilayer polymer starting sheet having an initial thickness of at least 2 mm,
with the polymeric material of the first layer and of the third layer having a first molecular weight and each being from 25 to 34 weight % of the starting sheet, and the polymeric material of the second layer having a second molecular weight different from the first molecular weight and being from 32 to 50 weight % of the starting sheet, and the second layer being positioned between the first layer and the third layer;
providing a plurality of holes or depressions of a selected pattern in the coextruded multilayer polymer starting sheet; and
orienting the coextruded multilayer polymer starting sheet having the patterned plurality of holes or depressions therein to provide a plurality of oriented strands interconnected by junctions, and to configure the holes or depressions as grid openings in a space defined by the oriented strands and the junctions.

2. The method according to claim 1, wherein the first layer and the third layer of the coextruded multilayer polymer starting sheet are arranged on opposite planar surfaces of the second layer of the coextruded multilayer polymer starting sheet.

3. The method according to claim 1, wherein the first layer, the second layer, and the third layer are in contact both at the junctions and along the plurality of strands.

4. The method according to claim 1, wherein the coextruded multilayer polymer starting sheet has a thickness of from at least 2 mm to about 12 mm.

5. The method according to claim 1, wherein the first layer and the second layer of the coextruded multilayer polymer starting sheet each has a thickness of from about 0.5 mm to about 4.5 mm, and the second layer has a thickness of from about 1 mm to about 9 mm.

6. The method according to claim 1, wherein the polymeric material of the first layer and of the third layer is a virgin polypropylene, and the polymeric material of the second layer is a post-industrial or post-consumer polypropylene.

7. The method according to claim 1, wherein the coextruded multilayer polymer starting sheet having the patterned plurality of holes or depressions therein is oriented by uniaxial or biaxial stretching.

8. The method according to claim 1, wherein the plurality of oriented strands includes transverse strands, interconnected via the junctions, with substantially longitudinally oriented strands.

9. The method according to claim 1, wherein the coextruded multilayer polymer starting sheet has an oriented thickness of from about 0.2 mm to about 9 mm.

10. The method according to claim 1, wherein the coextruded multilayer polymer starting sheet once oriented exhibits an increased flexural stiffness and torsional rigidity relative to the flexural stiffness and torsional rigidity of a non-coextruded sheet having a substantially same starting thickness.

11. The method according to claim 1, wherein the integral geogrid is a uniaxial integral geogrid.

12. The method according to claim 1, wherein the integral geogrid is a biaxial integral geogrid.

13. The method according to claim 1, wherein the integral geogrid is a triaxial integral geogrid.

14. A method of providing an integral geogrid construction, comprising:
uniaxially or biaxially stretching a starting material that is a coextruded multilayer polymer starting sheet having at least coextruded first, second, and third layers of polymeric materials, and being formed in a single coextrusion, the coextruded multilayer polymer starting sheet having an initial thickness of at least 2 mm,
with the polymeric material of the first layer and of the third layer having a first molecular weight and each being from 25 to 34 weight % of the starting sheet, and the polymeric material of the second layer having a second molecular weight different from the first molecular weight and being from 32 to 50 weight % of the starting sheet, and the second layer being positioned between the first layer and the third layer, and
the starting material having a plurality of holes or depressions of a selected pattern therein, to provide an integral geogrid having a plurality of oriented strands interconnected by junctions and a plurality of grid openings in a space defined by the oriented strands and the junctions; and
embedding the integral geogrid in a mass of particulate material.

15. The method according to claim 1, wherein the plurality of oriented strands have an aspect ratio of greater than 1.0.

16. A method of making an integral geogrid, comprising the following steps:
coextruding a multilayer polymer starting sheet having at least coextruded first, second, and third layers of polymeric materials, with the polymeric material of the first layer and of the third layer having a first molecular weight and each being from 25 to 34 weight % of the starting sheet, and the polymeric material of the second layer having a second molecular weight different from the first molecular weight and being from 32 to 50 weight % of the starting sheet, with the second layer having a foamed or expanded structure, and with the coextruded multilayer polymer starting sheet having an initial thickness of at least 2 mm;
providing a plurality of holes or depressions of a selected pattern in the coextruded multilayer polymer starting sheet; and
orienting the coextruded multilayer polymer starting sheet having the patterned plurality of holes or depressions therein to provide a plurality of oriented strands interconnected by junctions, and to configure the holes or depressions as grid openings in a space defined by the oriented strands and the junctions.

17. The method according to claim 16, wherein the first layer and the third layer are arranged on opposite planar surfaces of the second layer.

18. The method according to claim 16, wherein the second layer has a thickness that is greater than a thickness of either of the first layer and the third layer.

19. The method according to claim 16, wherein after the step of orienting, the first layer, the second layer, and the third layer are in contact both at the junctions and along the plurality of strands.

20. The method according to claim 16, wherein the step of orienting the coextruded multilayer polymer starting sheet having the patterned plurality of holes or depressions therein is effected by uniaxial or biaxial stretching.

21. The method according to claim 16, wherein a chemical foaming agent is mixed with the polymeric material that is extruded to form the foamed or expanded second layer.

22. A method of making an integral geogrid, comprising:
providing a coextruded multilayer polymer starting sheet having an initial thickness of at least about 2 mm and having adjacent coextruded first, second, and third layers of polymeric materials, with the polymeric material of the first layer and of the third layer having a first molecular weight and each being from 25 to 34 weight % of the starting sheet, and the polymeric material of the second layer having a second molecular weight different from the first molecular weight and being from 32 to 50 weight % of the starting sheet, and with the coextruded multilayer polymer starting sheet being formed in a single coextrusion;
providing a patterned plurality of holes or depressions in the coextruded multilayer polymer starting sheet; and
orienting the coextruded multilayer polymer starting sheet having the patterned plurality of holes or depressions therein by stretching,
to provide a plurality of interconnected, oriented strands and to configure the holes or depressions as grid openings.

* * * * *

UNITED STATES PATENT AND TRADEMARK OFFICE
CERTIFICATE OF CORRECTION

PATENT NO. : 11,198,986 B2
APPLICATION NO. : 16/855184
DATED : December 14, 2021
INVENTOR(S) : William Stanley Shelton et al.

It is certified that error appears in the above-identified patent and that said Letters Patent is hereby corrected as shown below:

In the Claims

Column 13 Line 7 Claim 5:
Please change: "The method according to claim 1, wherein the first layer and the second layer of the coextruded multilayer polymer starting sheet each has a thickness of from about 0.5 mm to about 4.5 mm, and the second layer has a thickness of from about 1 mm to about 9 mm."
To -- The method according to claim 1, wherein the first layer and the third layer of the coextruded multilayer polymer starting sheet each has a thickness of from about 0.5 mm to about 4.5 mm, and the second layer has a thickness of from about 1 mm to about 9 mm. --

Signed and Sealed this
Thirty-first Day of May, 2022

Katherine Kelly Vidal
*Director of the United States Patent and Trademark Office*